United States Patent [19]

Lubomirsky et al.

[11] Patent Number: 5,627,738
[45] Date of Patent: May 6, 1997

[54] LOW COST, HIGH RELIABILITY SOFT START ARRANGEMENT

[75] Inventors: Vadim Lubomirsky, Penfield; Jeff C. Sellers, Palmyra, both of N.Y.

[73] Assignee: ENI, A Division of Astec America, Inc., Rochester, N.Y.

[21] Appl. No.: 445,341

[22] Filed: May 19, 1995

[51] Int. Cl.⁶ .................................................. H02H 7/122
[52] U.S. Cl. .................... 363/49; 363/50; 361/58; 361/106
[58] Field of Search ........................ 363/49, 50, 52, 363/55, 84, 125; 361/58, 92, 106, 111

[56] References Cited

U.S. PATENT DOCUMENTS

| | | | |
|---|---|---|---|
| 3,935,511 | 1/1976 | Boulanger et al. | 317/20 |
| 4,617,533 | 10/1986 | Paulik | 331/113 A |
| 4,621,313 | 11/1986 | Kiteley | 383/49 |
| 4,730,244 | 3/1988 | Zimmerman | 363/49 |
| 4,928,218 | 5/1990 | Kluttz | 363/37 |

FOREIGN PATENT DOCUMENTS

| | | |
|---|---|---|
| 0245568A1 | 11/1987 | European Pat. Off. . |
| 0591915A2 | 4/1994 | European Pat. Off. . |
| 752797 | 7/1956 | United Kingdom . |
| 2125634 | 3/1984 | United Kingdom . |
| 2144001 | 2/1985 | United Kingdom . |

OTHER PUBLICATIONS

Ellegard, K., "Inrush Current Limiter" Electronics World + Wireless World, Jul. 1994, p. 601.

*Primary Examiner*—Peter S. Wong
*Assistant Examiner*—Adolf Berhane
*Attorney, Agent, or Firm*—Trapani & Molldrem

[57] ABSTRACT

A soft start circuit for a high-power module permits trickle-charging of the capacitor bank prior to power switch actuation, and avoids large current surges or inrush at power up. Positive temperature coefficient thermistor devices, or PTCs are place in shunt across the switch elements or poles of the actuator or other power switch. In a power module that is powered by three-phase AC, the three power conductors are coupled through a three-pole contactor to AC inputs of a polyphase rectifier bridge, which has DC outputs coupled to the capacitor bank and to a load device, such as a high-power RF amplifier. The PTCs are connected, one per pole, in shunt across each pole of the contactor. Alternatively, metallized film capacitors can be employed in lieu of the PTCs.

8 Claims, 3 Drawing Sheets

LOW COST, HIGH RELIABILITY SOFT START ARRANGEMENT

BACKGROUND OF THE INVENTION

This invention relates to high power devices, and in particular concerns electronic devices which a high power module contains a large capacitor storage bank. The invention more specifically concerns circuitry and techniques for avoiding severe current inrush on power up.

In high power devices such as high power RF amplifiers, a large capacitor bank is employed for supplying a level DC power to the respective load devices. When the high power device is turned off, the capacitor bank discharges. The capacitor bank is completely discharged at the time of power up. When the power switch is actuated on, the discharged capacitor bank acts as a short circuit, and a large current inrush results, measured in the hundreds of amperes. This high current draw can damage input components, and can affect other equipment.

The current inrush problems associated with equipment of this type are well known, and especially for electronic equipment which contains a rather large capacitor bank. To address this problem, circuit designers have previously attempted a number of soft-start arrangements to limit the inrush current.

One rather cumbersome approach involves complicated circuitry that gradually increases the percentage of a line voltage sinusoid that is applied to the capacitor bank. Here the percentage of the waveform is gradually increased from zero to one-hundred percent, based on the accumulated charge on the capacitor bank. This arrangement involves an additional, rather complex circuit assembly, and appreciably increases the cost of the product.

Another approach to this problem involves connecting a negative temperature coefficient (NTC) thermistor device in series in the power conductor in advance of the capacitor bank. At the moment of power up, the NTC thermistor is cold, and its resistance value is relatively high. This high resistance limits the initial inrush current. Current passing through the device heats it, and as the temperature of the NTC device rises, its resistance decreases, which prevents the NTC device from further heating. However, the NTC device itself is subjected to a high energy impulse at start up, and the presence of the device in series in the power conductor can significantly degrade the reliability of the product.

Another approach is to employ a passive component to trickle-charge the capacitor bank before full power is applied, so that the charge on the capacitor bank itself will prevent large inrush current. One possible approach to this involves a resistor, a relay, and a timer: the capacitor bank is initially powered up through a large power resistor, and after a period of time the timer actuates the relay to short out the resistor. This approach requires a large heat-dissipating resistor, and also necessitates additional safety features to deal with smoke and/or fire in the event that the power resistor remains energized when the equipment is fully operational.

An alternative approach involves using a small auxiliary transformer and a bridge rectifier to precharge the capacitor bank. This technique involves additional components, and still requires the safety features mentioned just above.

OBJECTS AND SUMMARY OF THE INVENTION

Accordingly, it is an object of this invention to provide a low-cost, highly reliable soft start circuit arrangement that pre-charges the capacitor bank of a high power module, and yet avoids the drawbacks of the prior art.

It is another object of this invention to provide a soft start circuit arrangement that will not interfere with the operation of the high power module, and will not pose a safety threat.

It is a further object to provide a soft start circuit arrangement that employs a minimum of additional elements, and does not require any additional active elements.

In accordance with the above objects, a high power module is provided with a soft start arrangement. The module itself has power input conductors, with a load device connected to the power input conductors, and a storage capacitor bank coupled across the power input conductors. A power switch is interposed in series with at least one of the conductors, with one side connected to the capacitor bank and load device, and with the other side connected to an electrical power source. The power can be DC, single phase AC, or polyphase AC. To effect the soft start precharging, a precharging device is coupled in shunt across the power switch for permitting the capacitor bank to charge up, at low power, when the power switch is open. The capacitor bank is then substantially fully charged when the power switch is actuated or closed, so that power surges are avoided at power up. In a DC or single-phase AC circuit, the precharging device can preferably be a positive-temperature-coefficient (PTC) thermistor. In a three-phase AC circuit, there are preferably three switch elements, one associated with each line phase, and a precharging device coupled in shunt across each of the respective switch elements. In the case of a three-phase or other polyphase arrangement, a polyphase rectifier is employed, having respective AC inputs connected to the respective electrical phases, and DC outputs that power the load device and the capacitor bank. The soft start circuit arrangement can employ PTC thermistors across the respective switch elements, or alternatively, metallized film capacitors across the respective switch elements.

In any of these embodiments, a passive component trickle-charges the capacitor bank before full line voltage is applied. Before the input power switch elements, which can be the poles of a contactor, are closed, the charging devices, i.e., PTC thermistors or the metallized film capacitors, supply trickle-charging current to the capacitor bank. The level of charge on the capacitor bank is sufficient to avoid a large current inrush. The reliability of the complete ensemble is greatly improved, because the devices (i.e., the PTC thermistors or the metallized film capacitors) carry only a relatively small mount of trickle-charging current, rather than a massive current impulse. The PTC devices need to be able to pass the initial current level. In operation, the main current travels parallel to the device through the closed switch element. No heat sinking is required for the PTC devices, which are by their nature current limiting, and will restrict current flow by temperature rise. In the event that the contactor does not close fully, the PTC devices will carry a limited current, and the resistance of the devices will become very large. This allows the power module to operate at only a fraction of its full capacity. The metallized film capacitors are low-loss devices, and do not require any protective measures.

The above and many other objects, features, and advantages of this invention will become apparent from the ensuing description of a few selected preferred embodiments, which should be read in connection with the accompanying Drawing.

DETAILED DESCRIPTION OF THE PREFERRED EMBODIMENTS

Figure 1:
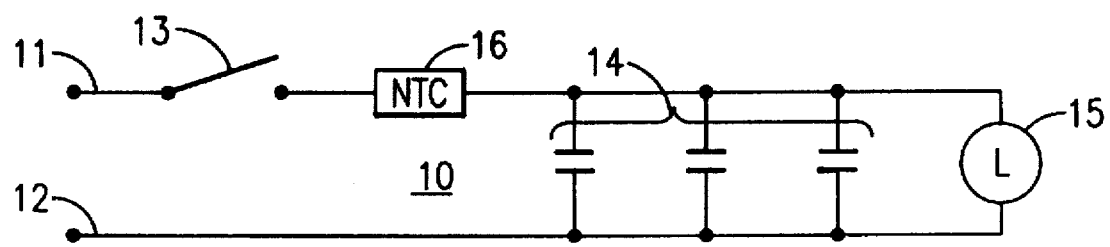
FIGS. 1 and 2 are schematic diagrams of soft start arrangements according to the prior art.

With reference to the Drawing, FIG. 1 illustrates a typical soft start circuit of the prior art, employing a negative-temperature-coefficient (NTC) thermistor device. Here, for sake of simplicity, the power module 10 is configured as a DC device, with a positive conductor 11 and a negative conductor 12 connected to a power source (not shown). There is a power switch 13 in series in the power conductor 11, and the conductors 11, 12 lead to a capacitor storage bank 14 and an associated load device 15. The load device can be, e.g., a high-power RF amplifier. In this prior-art arrangement, the soft-start feature is in the form of a negative-temperature-coefficient (NTC) thermistor device, coupled in series with the power switch 13. The NTC device has a negative resistance/temperature characteristic, so that it has a high resistance initially, i.e., when the device is cold. When the switch 13 is closed and current begins to flow through the NTC thermistor 16, the device will self-heat, and when the temperature rises above a critical temperature, the resistance will drop sharply, to a few ohms or less.

While this arrangement will avoid high current surges at start up, the circuit does have other problems. The NTC device 16 is always in line in the current power conductor 11. The element can burn out or malfunction, degrading the system reliability. Also, the thermistor 16 is always present in the input module, and is absorbing at least some power during operation, thereby reducing system efficiency.

Figure 2:
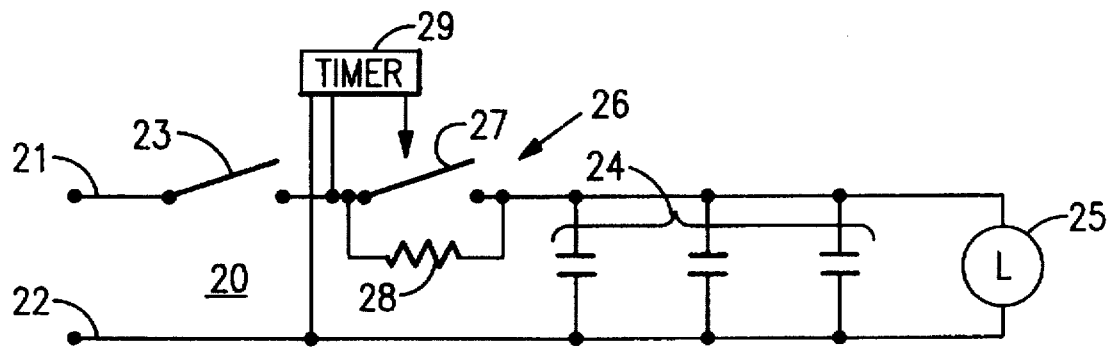

An alternative prior-art arrangement of a power module 20 is shown in FIG. 2, here employing a relay and a trickle-charge resistor. As in the FIG. 1 arrangement there are input power conductors 21 and 22, with a power switch 23 in line in one of the conductors 21, and a capacitor bank 24 and load device 25 following the switch 23. In this arrangement, a soft-start feature includes a relay 27, with its electrical contacts (here, the normally-open contacts) in series in the power conductor 21 after the switch 23. A power dissipating resistor 28 is coupled in parallel to the relay 27 to pass trickle charging current to the capacitor bank 24 when the switch 23 is actuated closed. A delay timer 29 actuates the relay 27 when a predetermined delay interval has passed to fully energize the power module. In this arrangement, the problem of heat dissipation in the resistor 28 needs to be addressed, as well as the problems that can arise if the delay timer fails or signals too early. Additional safety features are also required to prevent smoke and/or fire in the event that the power resistor 28 stays fully energized when the equipment is operational.

Although not shown here, a further prior arrangement involves a small transformer and a bridge rectifier to pre-charge the capacitor bank. This technique involves two additional elements which consume power and which necessitate the same safety features required in the circuitry described just above.

Figure 3:
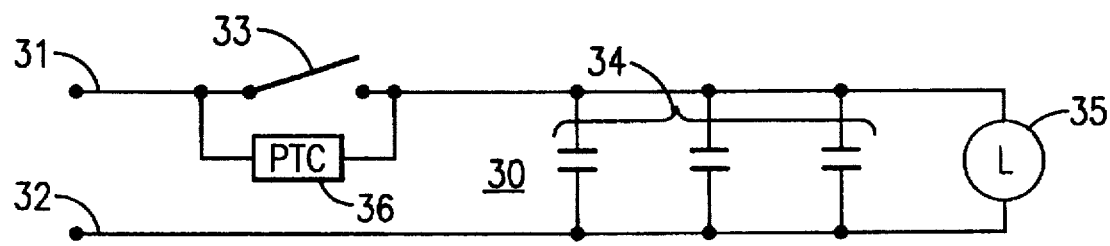
FIG. 3 is a simplified circuit schematic of a soft start circuit arrangement according to an embodiment of the invention.

The improvement of the present invention, which can be seen with reference to FIG. 3, involves the use of positive-temperature-coefficient (PTC) thermistor devices, one per pole of the power switch, connected in shunt across the associated switch element. The use of the PTC devices avoids large current inrush but does not necessitate the additional safety measures required in the prior art arrangements.

As shown here, input power conductors 31 and 32 with a power switch 33 connected in circuit in the conductor 31, feed input power to a capacitor bank 34 and load device 35, as in the arrangements described above. Here a PTC thermistor device 36 is coupled in shunt across the power switch 33. As soon as the input power is applied, i.e., by making of a (not-shown) circuit breaker, the capacitor bank 34 will begin to charge up through the PTC device 36. By the time the power switch 33 closes, the capacitor bank is precharged enough to avoid large current inrush. The reliability of the power module is greatly improved, as the PTC device 36 carries only a relatively small trickle charge current into the capacitors, instead of a massive current pulse. The device 36 requires no heatsinking, because the PTC device 36 is by nature current self-limiting. The rise in temperature of the device 36 is also self-limiting. No additional safety features are required against the event that the power switch fails to close when it is supposed to. If the power switch fails, the resistance of the PTC device 36 will rise high enough to let the power module operate at only a small fraction of its full capacity.

Figure 4:
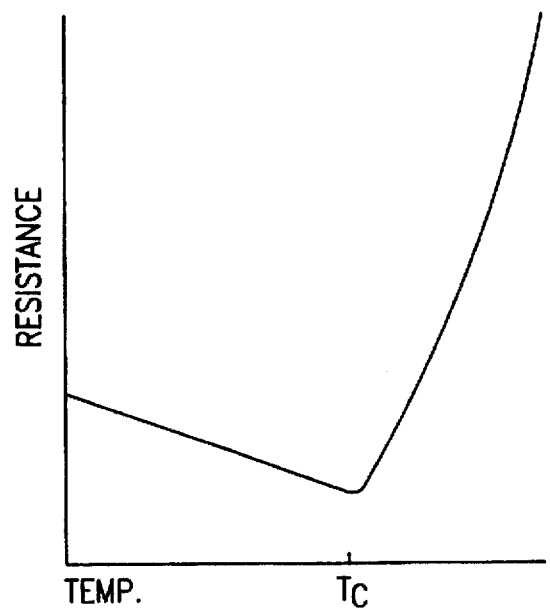
FIG. 4 is a resistance-to-temperature characteristic chart of a PTC thermistor device of the type employed in the embodiment of FIG. 3.

A typical characteristic chart of the resistance versus temperature for the device 36 is shown in FIG. 4. The device typically has a negative temperature coefficient below a temperature threshold $T_C$, and then a sharply positive temperature coefficient above that transition temperature. In this region the resistance can rise several orders of magnitude above the low-temperature resistance. In a typical application, one can select the PTC device to have an initial cold resistance (25° C.) often to one hundred ohms, e.g. fifty ohms. The device can have a typical transition temperature $T_C$ of 50° to 100° C., above which the resistance can rise to 1000 ohms or higher. In the event that the switch 33 does not function properly, the device 36 will self-heat, and its high resistance will keep the input power at a low safe level, operating at only a fraction of normal power.

Figure 5:
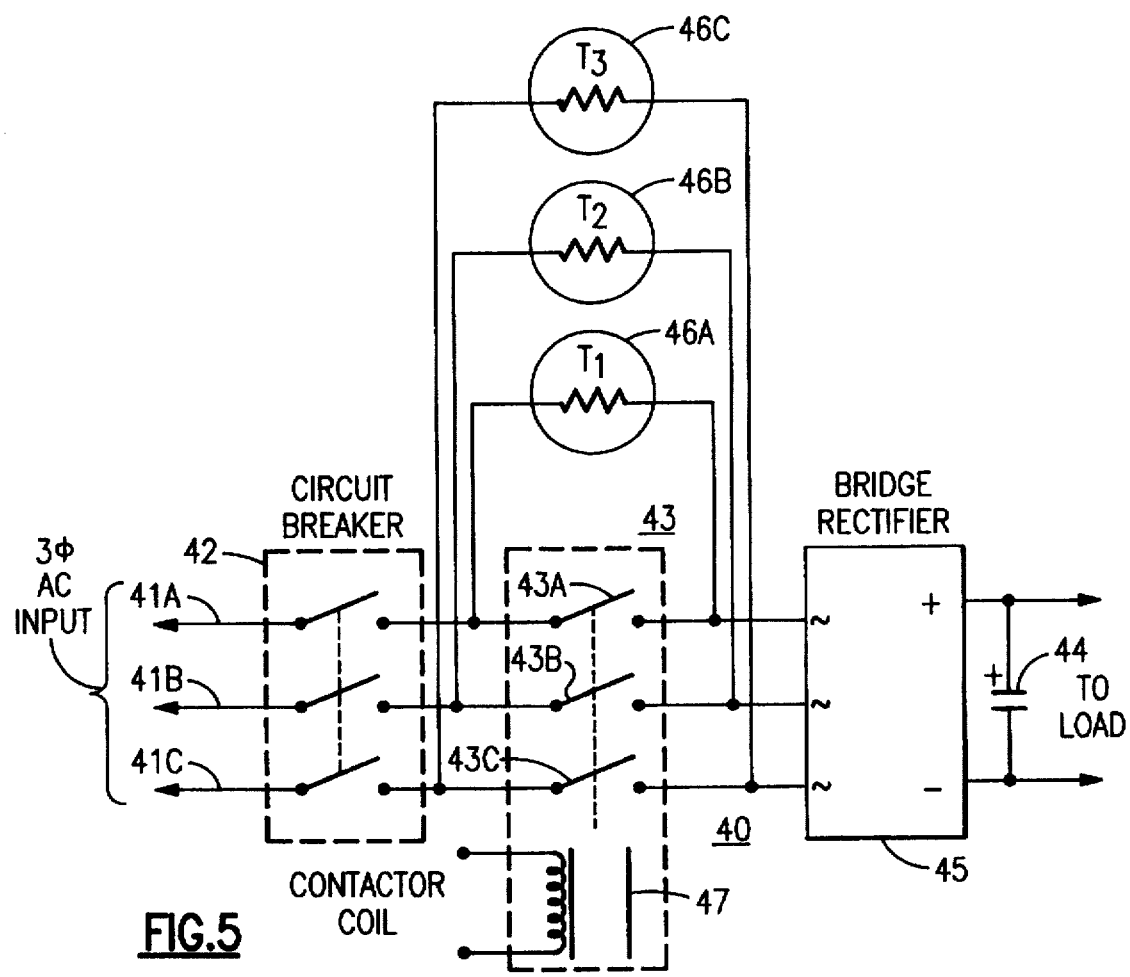
FIG. 5 is a circuit schematic of a polyphase soft start arrangement according to an embodiment of the invention.

A practical embodiment of a soft start feature 40 of this invention is shown in FIG. 5. Here, the power module is configured for operation with three-phase AC power, and there are three AC input conductors 41A, 41B, and 41C coupled to respective AC power phases. A three-pole AC circuit breaker 42 is interposed ahead of a three-pole power switch 43, which here is in the form of an electrically controlled contactor. The contactor has three poles or switch elements 43A, 43B, and 43C. After the contactor, the AC input conductors lead to respective AC inputs of a three-phase bridge rectifier 45, which has a pair of DC outputs that connect to the capacitor bank 44 and to a load device, which is not shown in this view. Respective PTC thermistor devices 46A, 46B, and 46C are connected in shunt with associated ones of the switch elements 43A, 43B, and 43C. A contactor coil 47 is energized from a not-shown control to close the contactor switch elements. Here, as soon as the circuit breaker 42 is closed the PTC devices 46A, 46B, and 46C trickle-charge the capacitor bank 44. Then, when the contactor 43 is actuated, the capacitor bank 44 will have been pre-charged, avoiding a large current inrush.

Figure 6:
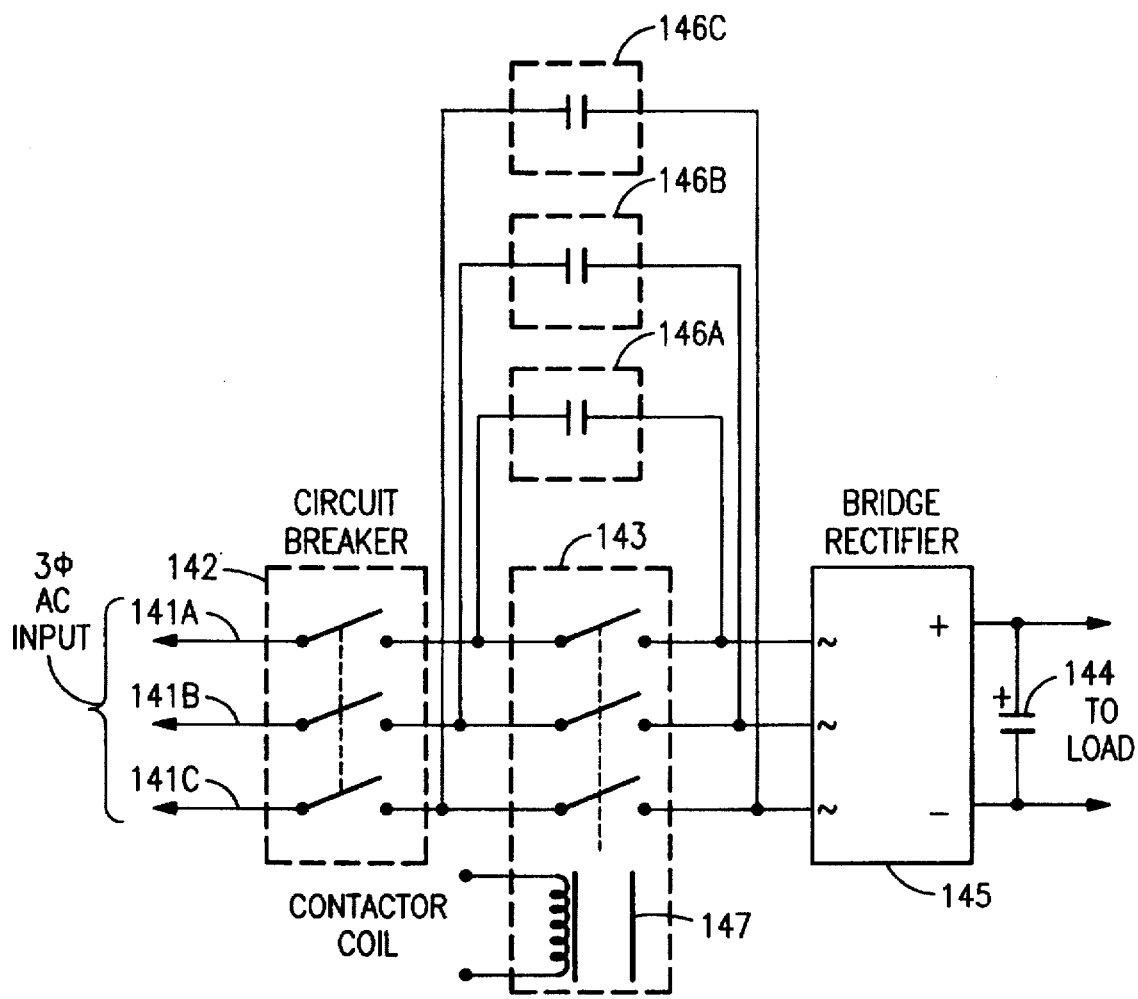
FIG. 6 is a circuit schematic of a capacitor-based soft start arrangement according to an embodiment of the invention.

An alternative embodiment of a soft start arrangement 140 is shown in FIG. 6. Here elements that are similar to those of the FIG. 5 embodiment are identified with the same reference numbers, but raised by 100, and a detailed description of those features will not be repeated here. Rather than the PTC thermistors of the previous embodiment, bypass capacitors 146A, 146B, and 146C are employed, connected in shunt across associated ones of the contactor poles or switching elements 143A, 143B, and 143C. The capacitors 146A to 146C have the role of passing a trickle charge of AC current to the rectifier bridge 145 and thence to the capacitor bank 144. The bypass capacitors 146A, 146B, and 146C typically have a capacity that is much smaller than the capacity of the bank 144, so most of the input trickle-charge voltage will appear across the bypass capacitors. This limits input current to a low trickle-charge level prior to actuation of the contactor 143. In the event that the contactor does not close properly, the bypass capacitors 146A, 146B, and 146C permit operation of the power module at only a small fraction of its full power.

In a preferred mode, the capacitors 146A, 146B, 146C can be box-type metallized polypropylene film capacitors, of the type often employed as motor run capacitors. In this example the metallized film capacitors can be 10.0 microfarad devices, with an AC rating of 400 VAC, or higher. These capacitors are very low loss devices, and heat sinking is not required. Typically, the case temperature will not exceed 70° C.

In this embodiment, the polyphase AC power is provided as three-phase AC, with three conductors arranged in a delta configuration. It is also possible to employ a wye configuration, with either a three-pole or a four-pole contactor. The invention can also be practiced with polyphase AC arrangements of more or fewer phases, as needed for a given application.

While the invention has been described with reference to several preferred embodiments, it should be recognized that the invention is certainly not limited to those embodiments, and many modifications and variations will become apparent to persons skilled in the art without departing from the scope and spirit of the invention, as defined in the appended claims.

We claim:

1. Soft start circuit arrangement for a high power module of the type that includes power input conductors, a load device connected to said power input conductors, and a storage capacitor bank coupled across said power input conductors, comprising a power switch in series with one of said conductors, with one side connected to said capacitor bank and load device, and another side connected to an electrical power source providing AC electrical power;

a rectifier arrangement interposed between said power switch and said capacitor band and load device; and a charging capacitor coupled in shunt across said power switch for permitting said capacitor bank to charge when said power switch is open so as to avoid power surges when the power switch is actuated closed.

2. Soft start circuit arrangement according to claim 1 wherein said capacitor is a metallized film capacitor.

3. Soft start circuit arrangement for a high-power module that includes a plurality of power input conductors coupled to respective phases of a polyphase AC power source; a polyphase rectifier having AC inputs and DC outputs; a capacitor bank coupled across said DC outputs; a load device coupled across said DC outputs; a plurality of switches disposed in series in respective ones of said input conductors between said polyphase AC power source and said polyphase rectifier; and respective charging devices each disposed in shunt across an associated one of said switching devices, for permitting said capacitor bank to charge when said power switches are open so as to avoid power surges when the power switches are actuated closed.

4. Soft start circuit arrangement according to claim 3 wherein each said charging device is a positive-temperature-coefficient thermistor.

5. Soft start circuit arrangement for a high-power module that includes a plurality of power input conductors coupled to respective phases of a polyphase AC power source; a polyphase rectifier having AC inputs and DC outputs; a capacitor bank coupled across said DC outputs; a load device coupled across said DC outputs; a plurality of switches disposed in series in respective ones of said input conductors between said polyphase AC power source and said polyphase rectifier; and respective charging devices each disposed in shunt across an associated one of said switching devices, for permitting said capacitor bank to charge when said power switches are open so as to avoid power surges when the power switches are actuated closed; and wherein each said charging device is a capacitor coupled in shunt across its associated power switch.

6. Soft start circuit arrangement according to claim 5 wherein each said capacitor is a metallized film capacitor.

7. Soft start circuit arrangement according to claim 6 wherein each said capacitor is a metallized polypropylene box-style capacitor.

8. Soft start circuit arrangement for a high power module of the type that includes power input conductors, a load device connected to said power input conductors, a storage capacitor bank coupled across said power input conductors, a main power switch in series with one of said conductors and operatively controlled to switch power on to said load device, with one side of said main power switch connected to the capacitor bank and load device, and another side connected to an electrical power source, and a current-restrictive device coupled in shunt with said main power switch which pre-charges said capacitor bank and prevents large surges of inrush current from flowing to said capacitor bank when the power switch is actuated closed; wherein said current restrictive device includes a PTC thermistor coupled in shunt across said main power switch for permitting said capacitor bank to charge gradually when said main power switch is open and which self-heats to limit current flow to a low safe level in the event of a malfunction.

* * * * *

UNITED STATES PATENT AND TRADEMARK OFFICE
CERTIFICATE OF CORRECTION

PATENT NO. : 5,627,738
DATED : May 6, 1997
INVENTOR(S) : Vadim Lubomirsky, et. al.

It is certified that error appears in the above-indentified patent and that said Letters Patent is hereby corrected as shown below:

Column 2, line 46, "mount" should read --amount--.

Signed and Sealed this

First Day of July, 1997

Attest:

BRUCE LEHMAN

*Attesting Officer*  *Commissioner of Patents and Trademarks*